US011140214B2

(12) United States Patent
Varadarajan et al.

(10) Patent No.: US 11,140,214 B2
(45) Date of Patent: Oct. 5, 2021

(54) PROACTIVE CONDITIONED PREFETCHING AND ORIGIN FLOODING MITIGATION FOR CONTENT DELIVERY

(71) Applicant: ZYCADA NETWORKS, INC., Milpitas, CA (US)

(72) Inventors: Subramanian Varadarajan, Los Gatos, CA (US); Rosarin R. Antonyraj, Sunnyvale, CA (US)

(73) Assignee: ZYCADA NETWORKS, Campbell, CA (US)

( * ) Notice: Subject to any disclaimer, the term of this patent is extended or adjusted under 35 U.S.C. 154(b) by 0 days.

(21) Appl. No.: 16/902,148

(22) Filed: Jun. 15, 2020

(65) Prior Publication Data

US 2021/0029192 A1  Jan. 28, 2021

Related U.S. Application Data

(60) Provisional application No. 62/861,976, filed on Jun. 14, 2019.

(51) Int. Cl.
| | |
|---|---|
| G06F 15/16 | (2006.01) |
| H04L 29/08 | (2006.01) |
| G06F 16/957 | (2019.01) |
| G06F 16/93 | (2019.01) |

(52) U.S. Cl.
CPC .............. *H04L 67/06* (2013.01); *G06F 16/94* (2019.01); *G06F 16/9574* (2019.01); *H04L 67/02* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 10,735,548 B1* | 8/2020 | Lepeska | H04L 67/42 |
| 2008/0222268 A1* | 9/2008 | Miyamoto | H04L 67/02 |
| | | | 709/217 |
| 2011/0145321 A1* | 6/2011 | Jiang | H04L 67/34 |
| | | | 709/203 |
| 2015/0120858 A1* | 4/2015 | Anderson | H04L 67/2847 |
| | | | 709/213 |

\* cited by examiner

*Primary Examiner* — Quang N Nguyen
(74) *Attorney, Agent, or Firm* — Morgan, Lewis & Bockius LLP (57) ABSTRACT

A method of delivering content comprises, at a node in a network, receiving a first request to access a first webpage from a client computer, and after establishing a session with the client computer, transmitting a second request to a server in the network. The method further comprises receiving a first file for rendering the first webpage, extracting one or more hyperlinks to one or more second webpages from the first file, prefetching one or more second files for rendering respective ones of the one or more second webpages, and storing the one or more second files in a session cache associated with the session. The method further comprises receiving a third request to access a third webpage from the client computer; retrieving a third file for rendering the third webpage from the session cache in response to determination that the one or more second files include the third file; and transmitting the third file to the client computer.

20 Claims, 6 Drawing Sheets

PROACTIVE CONDITIONED PREFETCHING AND ORIGIN FLOODING MITIGATION FOR CONTENT DELIVERY

RELATED APPLICATIONS

This application claims the benefit of U.S. Provisional Patent Application No. 62/861,976 entitled "Proactive Conditioned Prefetching and Origin Flooding Mitigation For Content Delivery," filed Jun. 14, 2019, which is incorporated herein in its entirety.

FIELD OF THE INVENTION

The various embodiments described in this document relate to content delivery in a mesh network, and in particular to methods and systems for proactive conditioned prefetching and/or for mitigating origin flooding during content delivery.

BACKGROUND OF THE INVENTION

Content delivery networks (CDNs) aim to serve content to end-users with high availability and high performance. In particular, CDNs deploy proxy servers in multiple, geographically diverse data centers (or edge nodes) to cache and serve the content. When the content is requested, the request is directed to the node that, for example, will require the fewest hops, or is the least number of network seconds away from the client requesting the content. Typically, this results in the selection of an edge node that is closest to the client. For example, a proxy server within a telecommunications service provider (TSP) network may cache and serve content to customers of the TSP to lessen demands on the network backbone, and to quickly and reliably deliver the content. Caching content in many locations to maximize the chances of having a proxy server close to any given client, however, can incur significant costs. Also, some content such as dynamic content may not be cacheable and the edge nodes processing the requests for such content will have to obtain the content from the origin servers hosting the content.

SUMMARY

Systems and methods according to some embodiments employ proactive conditioned prefetching and/or origin flooding mitigation during content delivery.

In some embodiments, a method of delivering content comprises, at a node in a network: receiving a first request to access a first webpage from a first client computer system coupled to the network; establishing a first session with the first client computer system; transmitting a second request to a first server in the network in response to receiving the first request; receiving a first file for rendering the first webpage; transmitting the first file to the first client computer system; extracting one or more hyperlinks to one or more second webpages from the first file; prefetching one or more second files for rendering respective ones of the one or more second webpages; storing the one or more second files in a first session cache associated with the first session; receiving a third request to access a third webpage from the first client computer system; determining if the one or more second files include a third file for rendering the third webpage; retrieving the third file from the first session cache in response to determination that the one or more second files include the third file for rendering the third webpage; and transmitting the third file to the client computer system.

In some embodiments, establishing a first session with the first client computer system includes determining a session ID in the first request and associating the first session cache with the session ID. In some embodiments, the third request includes the session ID.

In some embodiments, extracting the one or more hyperlinks includes determining a plurality of hyperlinks included in the first file, and selecting the one or more hyperlinks from the plurality of hyperlinks. In some embodiments, extracting the one or more hyperlinks further includes, for each hyperlink of the plurality of hyperlinks, determining a probability of receiving a subsequent request related to the first request from the first client computer system to access a webpage associated with the each hyperlink. In some embodiments, the one or more hyperlinks each has a respective probability that is higher than that of any of the rest of the one or more hyperlinks. In some embodiments, determining the plurality of hyperlinks included in the first file comprises parsing the first file.

In some embodiments, determining the plurality of hyperlinks included in the first file comprises using a headless browser to render the first file. In some embodiments, determining the plurality of hyperlinks included in the first file comprises using a variant of a browser to render the first file. In some embodiments, determining the plurality of hyperlinks included in the first file comprises using JavaScript code to render the first file. In some embodiments, determining the plurality of hyperlinks included in the first file comprises injecting customer code into the first file.

In some embodiments, prefetching one or more second files comprises, for each link of the one or more hyperlinks, transmitting a fourth request to the first server for a respective file to render a webpage associated with the each link, and receiving the respective file from the first server.

In some embodiments, the method of delivering content further comprises: in response to the determination that the one or more second files include the third file for rendering the third webpage, determining if the third file is stale; in response to determination that the third file is stale, transmitting a request to the first server for a refreshed third file; receiving the refreshed third file; pushing the refreshed third file to the first client computer system subsequent to transmitting the third file to the first client computer system; and updating the first session cache with the refreshed third file.

In some embodiments, the method of delivering content further comprises: detecting content specific to the first client computer system from the first file; removing the content specific to the first client computer system from the first file to generate a first template file; and storing the first template file in a public cache distinct from the first session cache.

In some embodiments, the first request includes a first IP address, the method of delivering content further comprises: receiving a fifth request to access a fifth webpage from a second client computer systems, the fifth request including the first IP address; extracting information about the second computer system from the fifth request; retrieving the first template file from the public cache; inserting the information about the second computer system into the first template to generate a fifth file for rendering the fifth webpage; and transmitting the fifth file to the second computer system.

In some embodiments, a method of delivering content comprises, at a node in a network: receiving a first request to access a first webpage from a first client computer system coupled to the network, the first request including a first IP address; transmitting a second request to a first server in the network in response to receiving the first request; receiving a first file for rendering the first webpage; transmitting the first file to the first client computer system; detecting content specific to the first client computer system from the first file; removing at least some of the content specific to the first client computer system from the first file to generate a first template file; storing the first template file in a cache; receiving a third request to access a second webpage from a second client computer systems, the third request including the first IP address; extracting information about the second computer system from the third request; retrieving the first template file from the cache; inserting the information about the second computer system into the first template to generate a second file for rendering the second webpage; and transmitting the second file to the second computer system as a response to the third request.

DESCRIPTION

Figure 1:
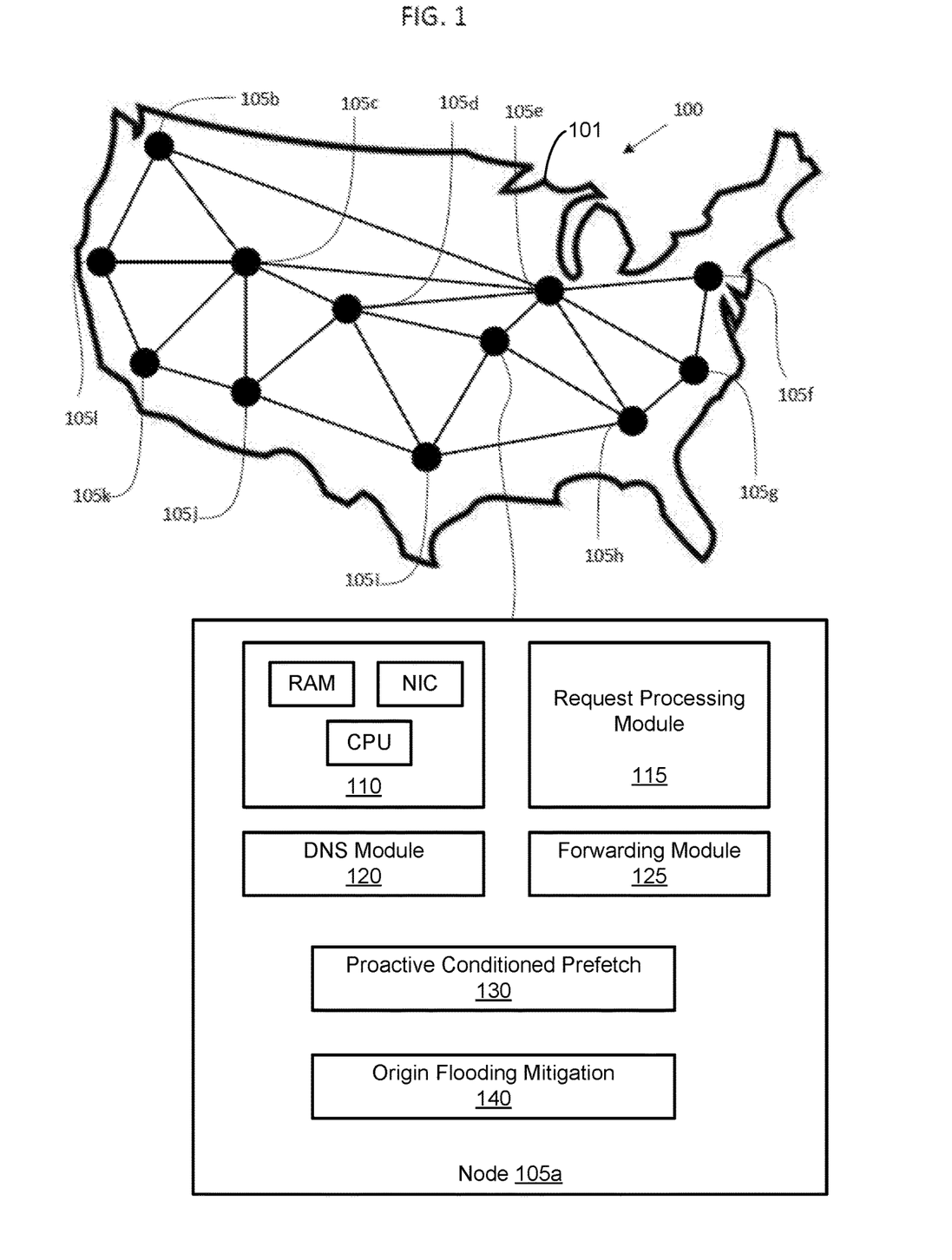
FIG. 1 is a block diagram illustrating a mesh network in accordance with some embodiments.

FIG. 1 illustrates, in block diagram form, an example of a mesh network 100, which includes proxy server nodes 105 (e.g., nodes 105a, 105b, 105c, 105d, 105e, 105f, 105g, 105h, 105i, 105j, 105k, and 105l) implementing proactive conditioned prefetching (PCP) and/or origin flooding mitigation (OFM), according to some embodiments. In some embodiments, mesh network 100 is a content delivery network (CDN) and/or application delivery network (ADN). Mesh network 100 includes a geographically distributed set of proxy server nodes 105 deployed in multiple data centers across a geographical region 101 (e.g., one or more cities, states, countries, or continents). Mesh network 100 may include more or fewer nodes 105 than illustrated.

In some embodiments, a respective node 105 (e.g., as illustrated by node 105a) includes hardware 110. Hardware 110 includes one or more processors ("CPU(s)"), data storage and memory (e.g., "RAM"), and network interface controllers ("NIC(s)"). The data storage and memory may be used for storing data, metadata, and programs (e.g., request processing module 115, DNS module 120, forwarding module 125, proactive conditioned prefetch (PCP) module 130, and origin flooding mitigation (OFM) module 140) for execution by the processor(s). In some embodiments, the data storage and memory may include one or more of volatile and non-volatile memories, such as Random Access Memory ("RAM"), Read Only Memory ("ROM"), a solid state disk ("SSD"), Flash, Phase Change Memory ("PCM"), and/or other types of data storage, such as magnetic disk drives, optical disk drives, etc. In some embodiments, the memory includes internal and/or distributed memory. In some embodiments, one or more buses (not shown) interconnect the various components of hardware 110. In some embodiments, NIC(s) connect one more of nodes 105 (e.g., nodes 105a-105l), via a wired and/or wireless network, with other nodes 105, client devices external to mesh network 100, and/or server devices external to mesh network 100.

In some embodiments, a respective node (e.g., as illustrated by node 105a) includes multiple modules. Each of these modules may be embodied in hardware, software, or a combination of hardware and software. Request processing module 115 processes requests (or traffic) from client computer systems, generate requests to other nodes or website servers to obtain content for caching, and transmit content to the client computer systems. In some embodiments, a respective node 105 (e.g., as illustrated by node 105a) includes domain name system (DNS) module 120. DNS module 120 stores next hop information for transmitting the requests to other nodes or website servers. For example, respective nodes 105 may determine respective neighboring nodes 105 and track the next hop for traffic using an address discovery protocol. In some embodiments, a respective node 105 (e.g., as illustrated by node 105a) includes forwarding module 125. Forwarding module 125 receives traffic from a client, service, or another node 105, determines a service and/or destination from the received traffic, and/or selects the next hop using the mapping stored by DNS module 120.

In some embodiments, a node 105 (e.g., node 105a) includes one or more proactive conditioned prefetch (PCP) modules 130 configured to prefetch and temporarily store content (e.g., non-cacheable content) in response to a request from a client device to access a webpage that includes one or more links to the content, and provides the content to the client device in response to subsequent request(s) in the same session. In some embodiments, a node 105 (e.g., node 105a) includes one or more origin flooding mitigation (OFM) modules 140 configured to generate and cache templates of webpages and, in response to a request from a client device to access a webpage, obtain and insert information specific to the client computer system into the template of the webpage to generate a file for rendering the webpage, which is then delivered to the client computer system.

Figure 2:
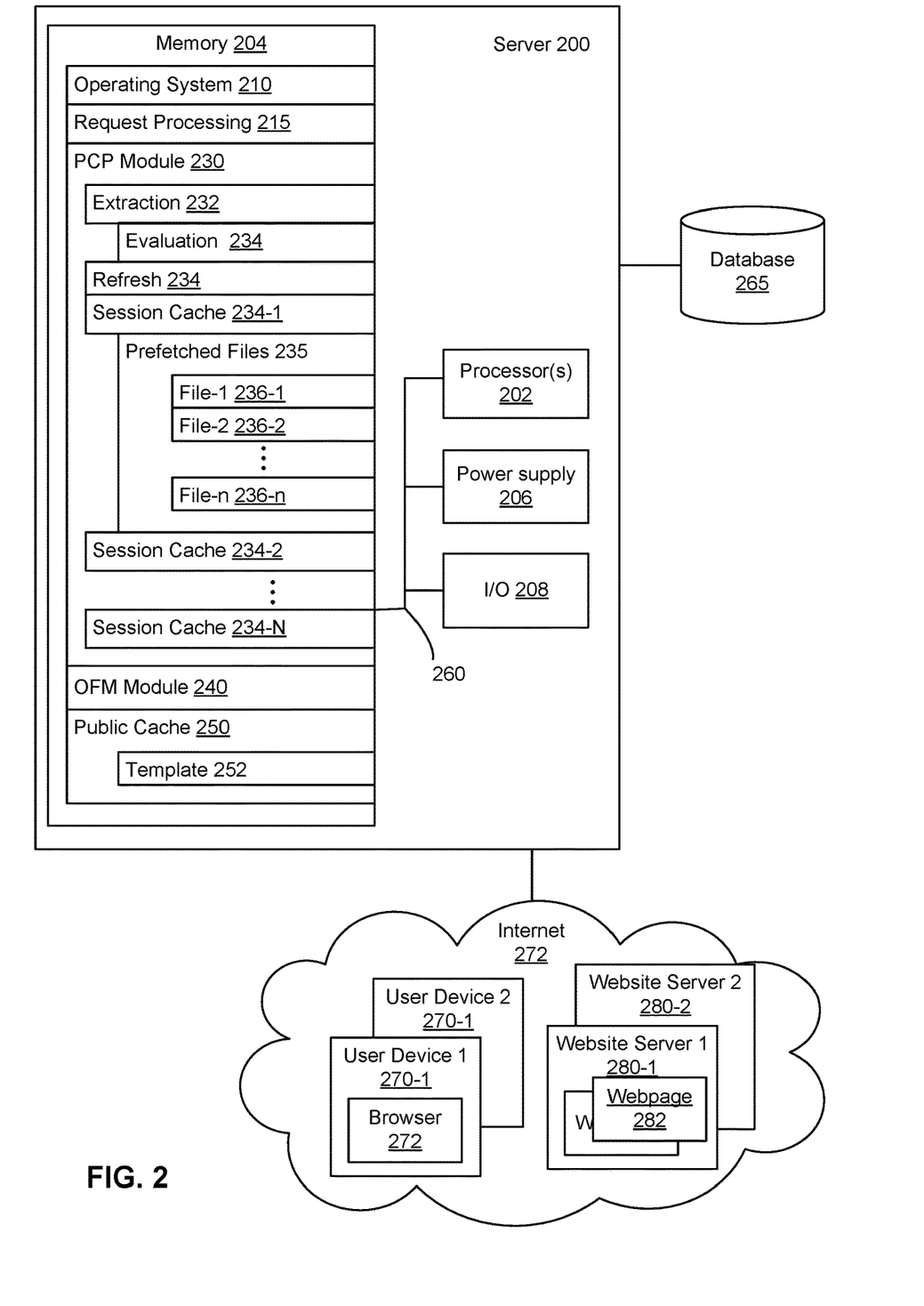
FIG. 2 is a system diagram of a server at a node in a mesh network in accordance with some embodiments.

In some embodiments, each node 105 in mesh network 100 includes one or more proxy servers for processing client requests for application and content data. FIG. 2 is a system diagram of server 200 in a node 105 (e.g., node 105a), in accordance with some embodiments. Server 200 typically includes one or more processor(s) 202, a memory 204, a power supply 206, an input/output (I/O) subsystem 208, and a communication bus 260 for interconnecting these components.

Processor(s) 202 execute modules, programs and/or instructions stored in memory 204 and thereby perform processing operations, including the methods described herein according to some embodiments.

In some embodiments, the memory 204 stores one or more programs (e.g., sets of instructions), snippets, and/or data structures, collectively referred to as "modules" herein. In some embodiments, memory 204, or the non-transitory computer readable storage medium of memory 204, stores the following programs, snippets, modules, and data structures, or a subset or superset thereof:

operating system 210;
request processing module 215;
PCP module 230, which includes, for example:
  Link extraction submodule 232, which analyzes html files for rendering webpages and identify hyperlinks from the html files;
  Evaluation module 234, which evaluates the links identified by the link extraction module 234 and select files for prefetching; and
  refresh module 268, which refreshes prefetched files to prevent them from becoming stale;
session caches 234-1 through 234-N, which are associated with the PCP module and temporarily store prefetched files for respective network sessions of N different network sessions;
OFM module 260; and
Public cache 250, which stores templates generated by the OFM module 260.

The above identified modules (e.g., data structures, and/or programs including sets of instructions) need not be implemented as separate software programs, snippets, procedures, or modules, and thus various subsets of these modules may be combined or otherwise re-arranged in various embodiments. In some embodiments, memory 204 stores a subset of the modules identified above. In some embodiments, a database 265 (e.g., a local database and/or a remote database) stores one or more modules identified above and data associated with the modules. Furthermore, the memory 204 may store additional modules not described above. In some embodiments, the modules stored in memory 204, or a non-transitory computer readable storage medium of memory 204, provide instructions for implementing respective operations in the methods described below. In some embodiments, some or all of these modules may be implemented with specialized hardware circuits that subsume part or all of the module functionality. One or more of the above identified elements may be executed by one or more of processor(s) 202.

I/O subsystem 208 communicatively couples server 200 to one or more devices such as website servers (e.g., 280-1, 280-2, ... ) hosting webpages 282 and/or one or more user devices (e.g., 270-1, 270-2, ... ) via a local and/or wide area communications network 272 (e.g., the Internet) via a wired and/or wireless connection. Each user device (e.g., user device 270-1) can request access to a webpage hosted by website servers 280 via an application such as a browser 272.

Communication bus 240 optionally includes circuitry (sometimes called a chipset) that interconnects and controls communications between system components.

Figure 3:
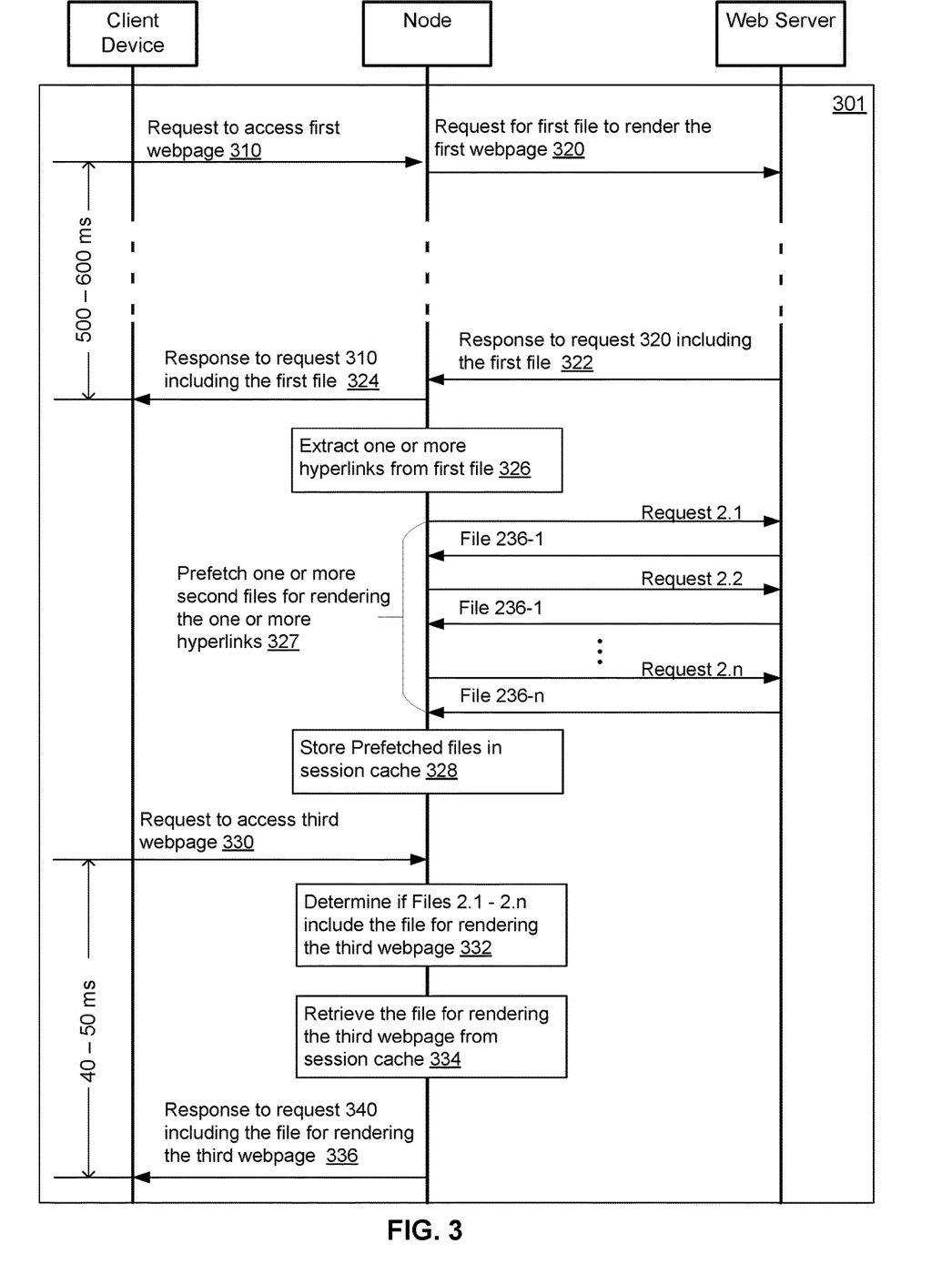
FIG. 3 is a flow chart illustrating a method of proactive conditioned prefetching (PCP) according to some embodiments.

FIG. 3 is a flow chart illustrating a method of proactive conditioned prefetching (PCP) according to some embodiments. As shown, the PCP method can be performed at a Node (e.g., node 105) in a network (e.g., network 272) by executing the PCP module 230. In some embodiments, the PCP method includes receiving a request 310 to access a first webpage (e.g., web page 282-1) from a Client Device (e.g., user device 270-1) coupled to the network. Request 310 may include a session ID and the method further includes establishing a first session 301 associated with the session ID with the Client Device. In this example, the first webpage is not a static webpage that is cached at the Node, so the PCP method further includes, in response to receiving request 310, transmitting a request 320 to a Web Server (e.g., website server 280-1) in the network that hosts the first webpage, receiving a first file 322 for rendering the first webpage from the Web Server, and transmitting a response 324 including the first file 322 to the Client Device;

Since the first file for rendering the first webpage is not cached at the Node and the Node has to obtain it from the Web Server before providing it to the Client Device, the Client Device may have to wait about 500 to 600 milliseconds (ms) after transmitting request 310 before receiving the first file 322 to render the first webpage. The first webpage includes links to other webpages that the user of the Client Device may choose to go to after viewing the first webpage. In some embodiments, while the user is viewing the first webpage, the PCP module is configured to proactively prefetch files for rendering at least some of these other webpages. Thus, the PCP method further includes extracting 326 one or more hyperlinks to one or more second webpages from the first file, and prefetching (327) one or more second files (e.g., files 236-1 through 236-$n$) for rendering respective ones of the one or more second webpages.

In some embodiments, the one or more second files are stored (328) in a first session cache (e.g., session cache 234-1) associated with the first session. If the Node receives a subsequent request 330 to access a third webpage from the Client Device and request 330 includes the session ID, the PCP method is configured to determine (332) if the one or more second files include a third file for rendering the third webpage, to retrieve (334) the third file from the first session cache in response to the determination that the one or more second files include the third file for rendering the third webpage, and to transmit the third file to the Client Device as a response 336 to request 330. Because the Node does not have to obtain the third file from the Web Server, it would take about 40-50 ms for the client device to receive the third file after transmitting request 330. Thus, the PCP method significantly reduce the time for a client device to access the linked webpages, resulting in enhanced user experience with the first and second webpages and increased efficiency of the Web Server in serving the content in these webpages.

As shown in FIG. 3, prefetching 327 the one or more second files may include, for each respective link of the one or more hyperlinks, transmitting a request (e.g., request 2.1, 2.2, ... , 2.n) to the Web Server for a respective file to render a webpage associated with a respective link, and receiving the respective file from the Web Server.

In some embodiments, the one or more hyperlinks can be extracted by, for example, the extraction module 232 at the Node, which identifies or determines a plurality of hyperlinks included in the first file, and then select the one or more hyperlinks from the plurality of hyperlinks. In some embodiments, the extraction module may include a headless browser, JavaScript code, or a variant of a common browser (e.g., Google Chrome, Firefox, etc.), which is used to render the first file at the Node to determine the plurality of hyperlinks. In some embodiments, the plurality of links can be determined by parsing the first file. In some embodiments, customer code can be injected into the first file to determine the plurality of links.

Figure 4A:
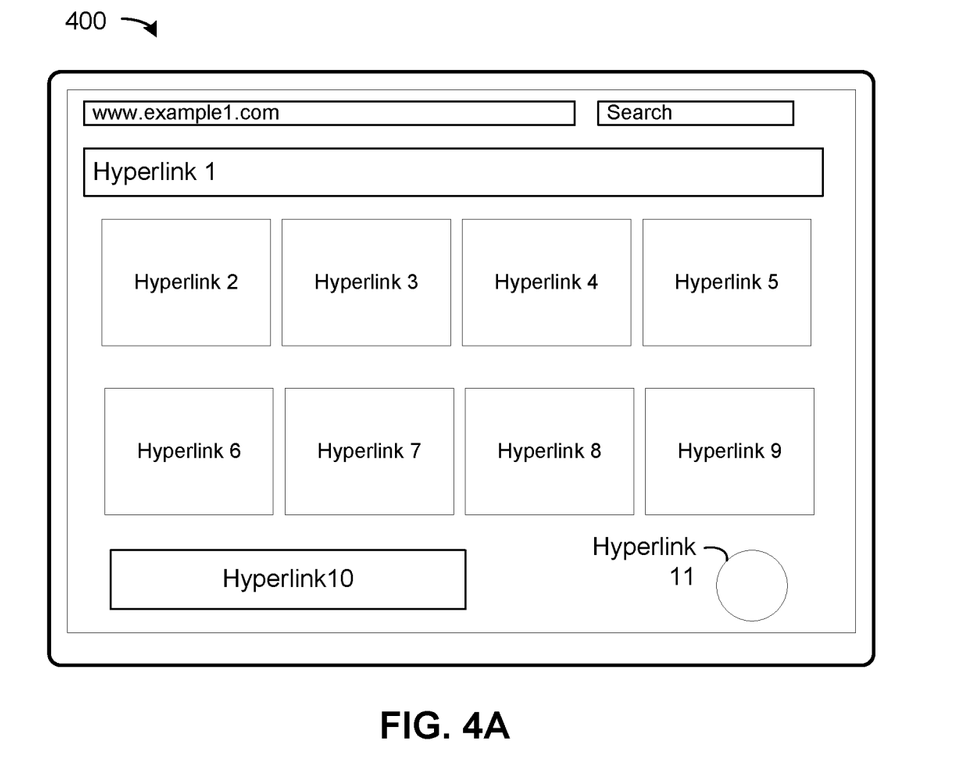
FIG. 4A illustrates an example of a webpage displayed on a computer screen and including a plurality of hyperlinks corresponding to different areas on the computer screen according to some embodiments.
Figure 4B:
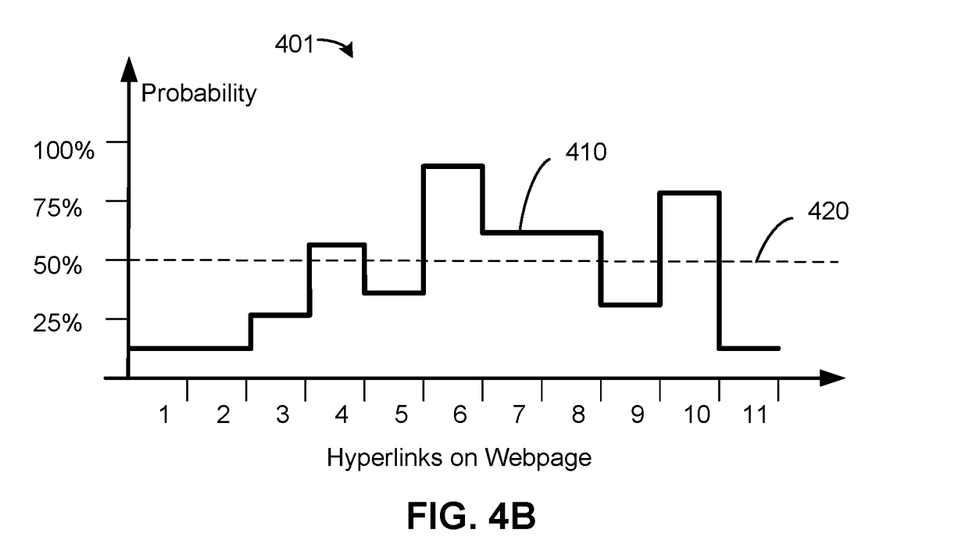
FIG. 4B is a chart illustrating probability of receiving a subsequent request to access each of a plurality of webpages associated, respectively, with a plurality of hyperlinks according to some embodiments.

In some embodiments, the one or more hyperlinks can be selected from the plurality of hyperlinks by determining a probability of receiving a subsequent request related to request 310 from the Client Device to access a webpage associated with each of the plurality of hyperlinks, and by selecting the hyperlinks that have their probability values above (or higher than) a preset threshold. For example, as shown in FIG. 4A, which illustrates the first webpage displayed on a computer screen 400, the first webpage may include a plurality of hyperlinks (e.g., hyperlinks 1 through 11) corresponding to different areas on the screen 400. In some embodiments, as shown in FIG. 4B, the extraction module 232 includes an evaluation module 234 configured to keep track of responses from the Client Device and/or other client devices after rendering the first webpage and to calculate the probability value 410 for each of the plurality of links based on statistical data derived from these responses. The hyperlinks above a preset threshold probability value 420 (e.g., hyperlinks 4, 6, 7, 8, and 10) are then selected as the one or more links.

Figure 5:
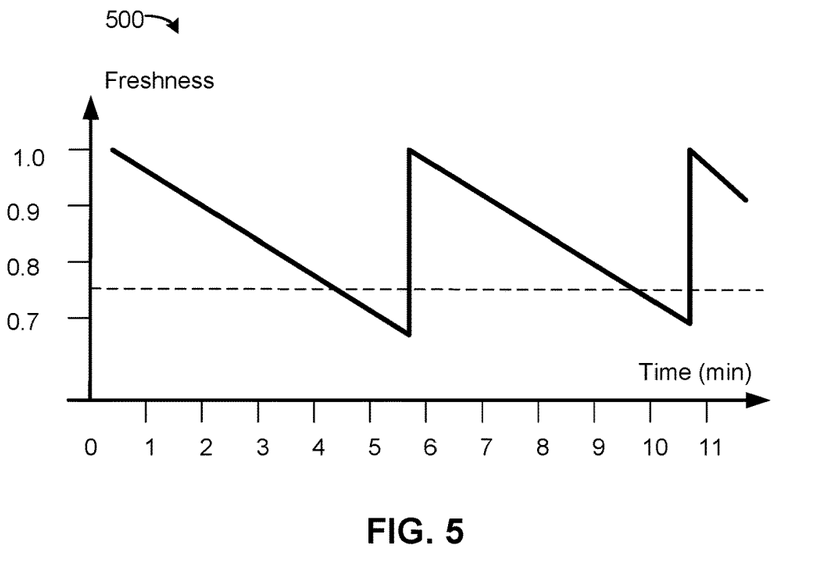
FIG. 5 is a plot of a freshness index curve for a file stored in a session cache according to some embodiments.

In some embodiments, the PCP module 230 also includes a refresh module 234 that keeps track of a freshness index for each of the one or more second files in the session cache (e.g., 234-1), and proactively refresh a file if the freshness index drops below a preset value. For example, FIG. 5 illustrates a curve representing the freshness index of the third file being at its maximum at the start of the curve when the third file is first stored in the first session cache. As time goes by, the freshness index may drop below the preset value indicated by the dashed line, meaning that the third file has gone stale. In some embodiments, after the third file is transmitted to the Client Device to ensure that the Client Device obtains a prompt response to request 330, the refresh module 234 would check the freshness index of the third file and prompt the request processing module 215 to send a request to the Web Server for the most recent version of the third file if the third file in the session has gone stale. The refresh module 234 also prompts the request processor to push the refreshed third file to the Client Device, so the Client Device can re-render the third webpage to display the most updated version of the webpage. The refresh module 234 then updates the first session cache with the refreshed third file, raising the freshness index to a new maximum, as shown in FIG. 5. This process may repeat until the first session ends.

In some embodiments, the session cache 234-1 is transient and is only used during session 301 and is specific to a particular Client Device. Information stored in the session cache 234-1 is not used in other network sessions with other client devices. Thus, if another client device requests to access the first webpage, a new session is established and another session cache (distinct from session cache 234-1) is assigned to the new session. Thus, during high traffic time, when a large number of client devices are accessing the first webpage, the Web Server can be flooded with the requests from these client devices. In some embodiments, to mitigate the flooding at the Web Server (e.g., an origin server), the OFM module 240 is executed to implement an OFM method, as illustrated in FIG. 7.

Figure 6:
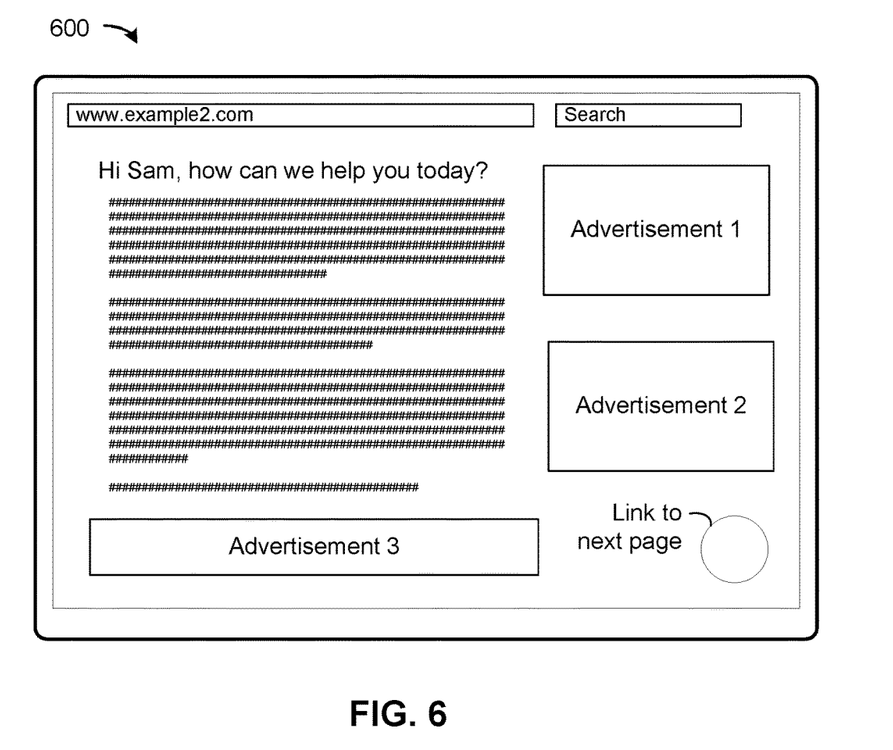
FIG. 6 illustrates another example of a webpage as displayed on a computer screen according to some embodiments.
Figure 7:
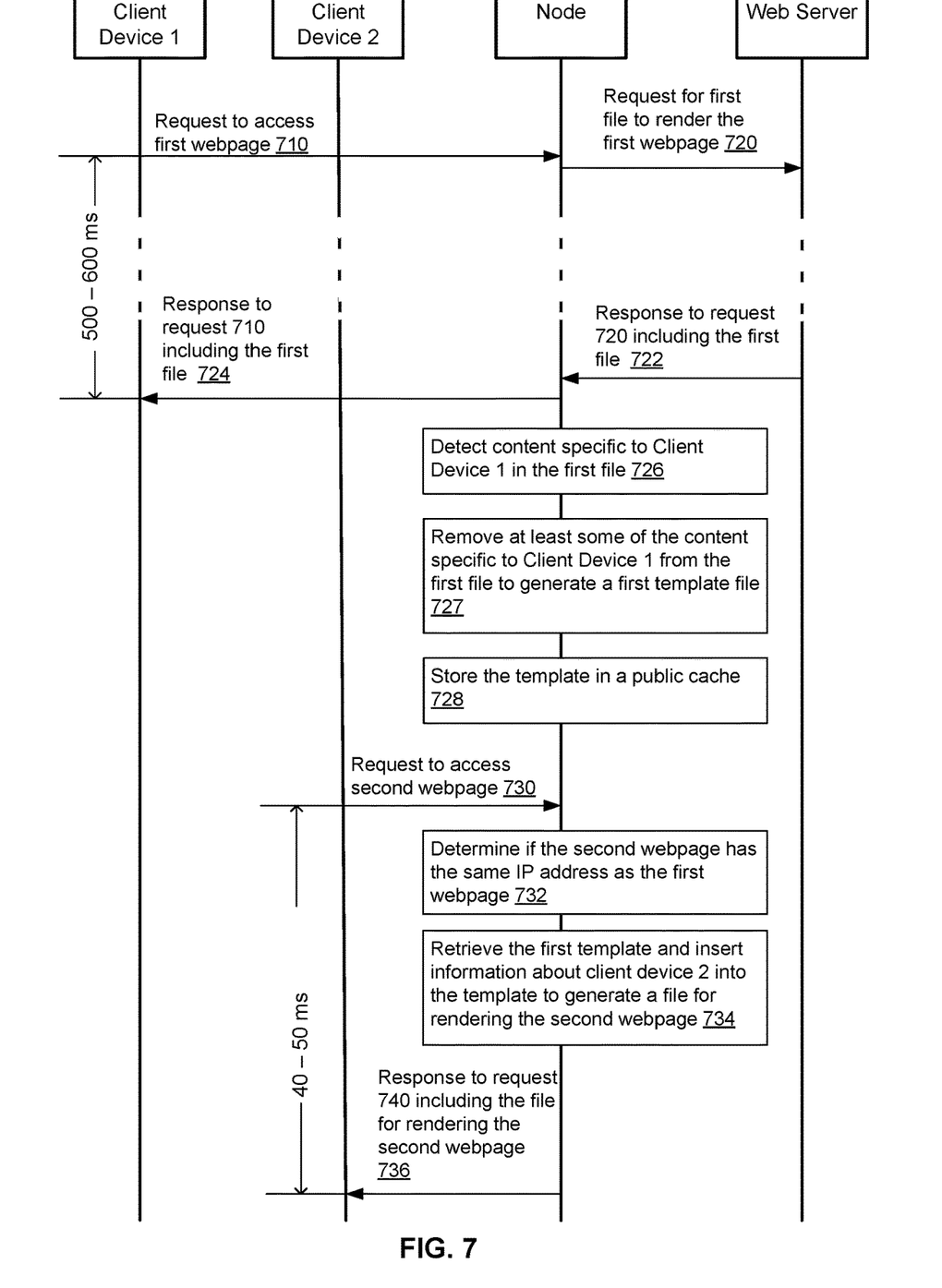
FIG. 7 is a flowchart illustrating a method for origin flooding mitigation according to some embodiments.

As shown in FIG. 7, the OFM method includes receiving a request 710 to access a first webpage from Client Device 1 (e.g., user device 1 270-1) coupled to the network, request 710 including a first IP address identifying a location of the first webpage. The OFM method further includes transmitting a request 720 to a Web Server in the network in response to receiving request 710, receiving a first file 722 for rendering the first webpage from the Web Server, and transmitting a response 724 including the first file 722 to Client Device 1. Because the first file has to be obtained from the Web Server, Client Device 1 has to wait about 500-600 ms after transmitting request 710 before receiving the file to render the requested webpage FIG. 6 illustrates another example of the first webpage as displayed on a computer screen 600. As shown, the first webpage may include information specific to Client Device 1 (e.g., the name "Sam"), and information specific to users of certain demographics (e.g., Advertisement 1 to Advertisement 3). The rest of the content can be common to all users. The OFM method further includes detecting 726 content specific to Client Device 1 from the first file, removing 727 at least some of the content specific to Client Device 1 (e.g., the name "Sam") from the first file to generate a first template file (e.g., template 252), and storing 728 the first template file in a cache (e.g., public cache 250).

In response to receiving a request 730 to access a second webpage from Client Device 2 (e.g., user device 2 270-2), the PCP method includes determining if request 730 includes the first IP address as the location of the second webpage, and if so, extracting 732 information about Client Device 2 from request 730, retrieving 734 the first template file from the cache, inserting 734 the information about Client Device 2 into the first template to generate a second file for rendering the second webpage, and transmitting the second file to Client Device 2 as a response 736 to request 730. The second webpage, after being rendered by Client Device 2, would be the same as the first webpage except the information specific to Client Device 1 is replaced by information specific to Client Device 2 (e.g., "Sarah" in place of "Sam"). Because of the OFM module, Client Device 2 only needs to wait 40-50 ms after transmitting request 730 before receiving the file to render the requested webpage.

In some embodiments, the first template file is specific to users of certain demographics associated with Client Device 1 and includes information specific to the certain demographics. Thus, the OFM module would determine if Client Device 2 belongs to the certain demographics before generating the second file using the first template.

It will be apparent from this description that aspects of the inventions may be embodied, at least in part, in software. That is, request processing module 115, DNS module 120, forwarding module 125, PCP module 130, OFM module 140, and/or computer-implemented method may be implemented or otherwise carried out in a computer system or other data processing system, such as one or more respective nodes 105, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. Thus, the techniques are not limited to any specific combination of hardware circuitry and software, or to any particular source for the instructions executed by a node 105. It will also be appreciated that additional components, not shown, may also be part of nodes 105, and, in certain embodiments, fewer components than that shown in FIG. 1 may also be used in nodes 105.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards, solid state drives (SSD), or other type of non-transitory computer-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention(s) have been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate virtualized resources or, in flow charts, optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A method of delivering content, comprising, at a node in a network:
    receiving a first request to access a first webpage from a first client computer system coupled to the network;
    establishing a first session with the first client computer system;
    transmitting a second request to a first server in the network in response to receiving the first request;
    receiving a first file for rendering the first webpage;
    transmitting the first file to the first client computer system;
    extracting one or more hyperlinks to one or more second webpages from the first file;
    prefetching one or more second files for rendering respective ones of the one or more second webpages;
    storing the one or more second files in a first session cache associated with the first session;
    receiving a third request to access a third webpage from the first client computer system;
    determining if the one or more second files include a third file for rendering the third webpage;
    retrieving the third file from the first session cache in response to determination that the one or more second files include the third file for rendering the third webpage; and
    transmitting the third file to the first client computer system,
    wherein extracting the one or more hyperlinks includes:
        determining a plurality of hyperlinks included in the first file, and selecting the one or more hyperlinks from the plurality of hyperlinks; and
        for each hyperlink of the plurality of hyperlinks, determining a probability of receiving a subsequent request related to the first request from the first client computer system to access a webpage associated with the each hyperlink;
        wherein the one or more hyperlinks each has a respective probability that is higher than that of any of the rest of the plurality of hyperlinks.

2. The method of claim 1, wherein establishing a first session with the first client computer system includes determining a session ID in the first request and associating the first session cache with the session ID.

3. The method of claim 2, wherein the third request includes the session ID.

4. The method of claim 1, wherein determining the plurality of hyperlinks included in the first file comprises parsing the first file.

5. The method of claim 1, wherein determining the plurality of hyperlinks included in the first file comprises using a headless browser to render the first file.

6. The method of claim 1, wherein determining the plurality of hyperlinks included in the first file comprises using a variant of a browser to render the first file.

7. The method of claim 1, wherein determining the plurality of hyperlinks included in the first file comprises using JavaScript code to render the first file.

8. The method of claim 1, wherein determining the plurality of hyperlinks included in the first file comprises injecting customer code into the first file.

9. The method of claim 1, wherein prefetching one or more second files comprises, for each link of the one or more hyperlinks:
    transmitting a fourth request to the first server for a respective file to render a webpage associated with the each link; and
    receiving the respective file from the first server.

10. The method of claim 1, further comprising:
    in response to the determination that the one or more second files include the third file for rendering the third webpage, determining if the third file is stale;
    in response to determination that the third file is stale, transmitting a request to the first server for a refreshed third file;
    receiving the refreshed third file;
    pushing the refreshed third file to the first client computer system subsequent to transmitting the third file to the first client computer system; and
    updating the first session cache with the refreshed third file.

11. The method of claim 1, further comprising:
  detecting content specific to the first client computer system from the first file;
  removing the content specific to the first client computer system from the first file to generate a first template file; and
  storing the first template file in a public cache distinct from the first session cache.

12. The method of claim 11, wherein the first request includes a first IP address, the method further comprising:
  receiving a fifth request to access a fifth webpage from a second client computer systems, the fifth request including the first IP address;
  extracting information about the second client computer system from the fifth request;
  retrieving the first template file from the public cache;
  inserting the information about the second client computer system into the first template file to generate a fifth file for rendering the fifth webpage; and
  transmitting the fifth file to the second client computer system.

13. A method of delivering content, comprising, at a node in a network:
  receiving a first request to access a first webpage from a first client computer system coupled to the network, the first request including a first IP address;
  transmitting a second request to a first server in the network in response to receiving the first request;
  receiving a first file for rendering the first webpage;
  transmitting the first file to the first client computer system;
  detecting content specific to the first client computer system from the first file;
  removing at least some of the content specific to the first client computer system from the first file to generate a first template file;
  storing the first template file in a cache;
  receiving a third request to access a second webpage from a second client computer system, the third request including the first IP address;
  extracting information about the second client computer system from the third request;
  retrieving the first template file from the cache;
  inserting the information about the second client computer system into the first template the to generate a second file for rendering the second webpage; and
  transmitting the second file to the second client computer system as a response to the third request.

14. A system in a network, comprising:
  one or more processors;
  memory; and
  one or more programs, wherein the one or more programs are stored in the memory and configured to be executed by the one or more processors, the one or more programs including instructions for:
  receiving a first request to access a first webpage from a first client computer system coupled to the network;
  establishing a first session with the first client computer system;
  transmitting a second request to a first server in the network in response to receiving the first request;
  receiving a first file for rendering the first webpage;
  transmitting the first file to the first client computer system;
  extracting one or more hyperlinks to one or more second webpages from the first file;
  prefetching one or more second files for rendering respective ones of the one or more second webpages;
  storing the one or more second files in a first session cache associated with the first session;
  receiving a third request to access a third webpage from the first client computer system;
  determining if the one or more second files include a third file for rendering the third webpage;
  retrieving the third file from the first session cache in response to determination that the one or more second files include the third file for rendering the third webpage; and
  transmitting the third file to the first client computer system,
  wherein extracting the one or more hyperlinks includes:
    determining a plurality of hyperlinks included in the first file, and selecting the one or more hyperlinks from the plurality of hyperlinks; and
    for each hyperlink of the plurality of hyperlinks, determining a probability of receiving a subsequent request related to the first request from the first client computer system to access a webpage associated with the each hyperlink;
    wherein the one or more hyperlinks each has a respective probability that is higher than that of any of the rest of the plurality of hyperlinks.

15. The system of claim 14, wherein determining the plurality of hyperlinks included in the first file comprises parsing the first file.

16. The system of claim 14, wherein determining the plurality of hyperlinks included in the first file comprises using a headless browser to render the first file.

17. The system of claim 14, wherein determining the plurality of hyperlinks included in the first file comprises using a variant of a browser to render the first file.

18. The system of claim 14, wherein determining the plurality of hyperlinks included in the first file comprises using JavaScript code to render the first file.

19. The system of claim 14, wherein determining the plurality of hyperlinks included in the first file comprises injecting customer code into the first file.

20. A non-transitory computer readable storage medium storing one or more programs configured for execution by an electronic device with a display in a network, the one or more programs comprising instructions for:
  receiving a first request to access a first webpage from a first client computer system coupled to the network;
  establishing a first session with the first client computer system;
  transmitting a second request to a first server in the network in response to receiving the first request;
  receiving a first file for rendering the first webpage;
  transmitting the first file to the first client computer system;
  extracting one or more hyperlinks to one or more second webpages from the first file;
  prefetching one or more second files for rendering respective ones of the one or more second webpages;
  storing the one or more second files in a first session cache associated with the first session;
  receiving a third request to access a third webpage from the first client computer system;
  determining if the one or more second files include a third file for rendering the third webpage;

retrieving the third file from the first session cache in response to determination that the one or more second files include the third file for rendering the third webpage; and transmitting the third file to the first client computer system, wherein extracting the one or more hyperlinks includes:

determining a plurality of hyperlinks included in the first file, and selecting the one or more hyperlinks from the plurality of hyperlinks; and for each hyperlink of the plurality of hyperlinks, determining a probability of receiving a subsequent request related to the first request from the first client computer system to access a webpage associated with the each hyperlink;

wherein the one or more hyperlinks each has a respective probability that is higher than that of any of the rest of the plurality of hyperlinks.

* * * * *

UNITED STATES PATENT AND TRADEMARK OFFICE
CERTIFICATE OF CORRECTION

PATENT NO. : 11,140,214 B2  
APPLICATION NO. : 16/902148  
DATED : October 5, 2021  
INVENTOR(S) : Varadarajan et al.

It is certified that error appears in the above-identified patent and that said Letters Patent is hereby corrected as shown below:

In the Claims

Claim 13, Column 11, Line 45, please delete "the first template the to" and insert --the first template file to--.

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*